Aug. 4, 1942.　　　D. M. GOODRICH　　　2,291,959
PNEUMATIC TIRE AND WHEEL ASSEMBLY

Filed Jan. 2, 1941

INVENTOR
David M. Goodrich
BY Willard D. Eakin
ATTORNEY

Patented Aug. 4, 1942

2,291,959

UNITED STATES PATENT OFFICE 2,291,959

PNEUMATIC TIRE AND WHEEL ASSEMBLY

David M. Goodrich, Mount Kisco, N. Y.

Application January 2, 1941, Serial No. 372,759

10 Claims. (Cl. 152—6)

This invention relates to pneumatic tire and wheel assemblies.

Some features of the assembly of the present application are more broadly claimed in my United States Patents No. 1,601,825, granted October 5, 1926, and No. 2,016,776, granted October 8, 1935, and my co-pending application Serial No. 267,834, filed April 14, 1939, which matured into Patent No. 2,268,249, December 30, 1941.

The chief objects of the present invention are to provide an assembly having more effective cushioning characteristics than the ordinary tire and rim assembly but adapted to employ, if it is desired, a pneumatic tire of the usual construction as a part of the assembly; to provide an assembly having very little "unsprung" weight between the vehicle springs and the pneumatic tires; to provide for effective damping out of high-frequency, low-amplitude oscillations; to provide a desirable shock-absorber effect close to the ground; to provide simplicity, strength and durability in an assembly of this character; and to provide economy of construction.

Figure 1:
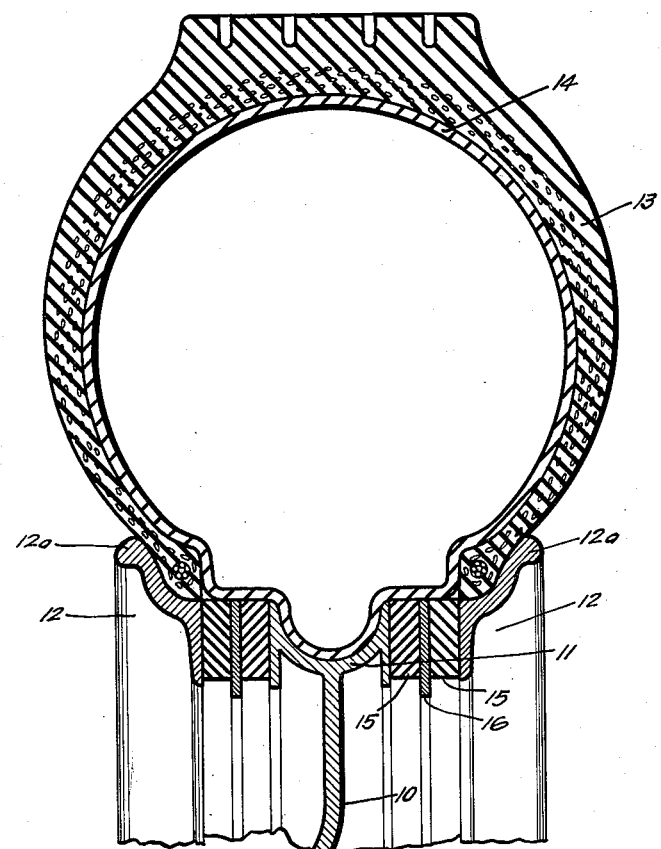
Fig. 1 is a fragmentary cross-section of an assembly embodying my invention in its preferred form.
Figure 2:
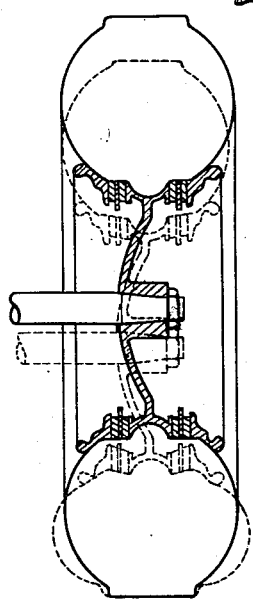
Fig. 2 is a diagrammatic axial section of a complete wheel assembly constructed in accordance with Fig. 1, with the cushioning action illustrated by dotted lines.

Referring to the drawing, the assembly illustrated in Figs. 1 and 2 comprises a wheel body 10 formed with a well-type or "drop-center" rim portion 11, a pair of side rings 12, 12 formed with standard tire-retaining flanges 12ª, 12ª, and a standard pneumatic tire 13, with its inner-tube 14, mounted upon the side rings 12.

Between each of the side rings 12 and the rim portion 11 of the wheel body are interposed a plurality of resiliently deformable cushioning rings 15, 15, of vulcanized soft rubber or similar material and, between the cushioning rings, a thin disc-like metal ring 16, each of the cushioning rings 15 being adhered to the metal members that embrace it, as by vulcanized adhesion in case they are of rubber. While I have shown more than one cushioning ring 15 at each side of the wheel body, my invention is not wholly limited to such plurality.

For rigidity against deformation from circular shape, and for dissipation of heat to the atmosphere, the disc-like metal ring 16 can be of greater radial width than the deformable cushioning rings 15, as shown, the cushioning rings being of relatively small radial dimension so as to have a desirably low modulus of elasticity in being deformed by the weight of the vehicle.

When the assembly is not under load, as when the axle of the vehicle is jacked up, the rim portion 11 of the wheel body, the cushioning rings 15, 15, the disc-like intervening rings 16, and the tire-retaining flange rings 12, are all coaxial, as shown in Fig. 1.

When the weight of the vehicle is imposed upon the assembly, however, the parts change from the relative positions in which they are shown in full lines in Fig. 2 to the relative positions in which they are shown in dotted lines in that figure, each of the several ring members described then assuming an eccentric or non-coaxial position with relation to the ring member or members adjacent to it, as is clearly shown in Fig. 2.

It is manifest from contemplation of the action illustrated in Fig. 2 that the assembly provides substantially the normal cushioning effect of the standard pneumatic tire and, in addition to that, the further cushioning effect of the deformation of the cushioning rings 15, and this further cushioning effect is highly desirable because, as energy is absorbed in the deformation and recoil of the cushioning rings, there is a damping effect, especially as to the high-frequency, low-amplitude oscillations or vibrations that are imparted to the floating side rings 12 by the tire casing.

With suitably strong adhesion between the cushioning rings and their embracing metal members the tire casing 13 can have the usual bulging side-walls as shown, for the sake of full "side-wall action," with its full amplitude, low-modulus cushioning effect, the force of the inflation pressure urging the floating side-rings away from each other not being so great as to break the adhesion even though the inner face of the casing, in cross-section, represents substantially more than a half circle, but I do not wholly limit my claims to an assembly having such rim-width and other dimensions as to cause the inner face of the casing to be of more than semi-circular cross-section.

Figure 3:
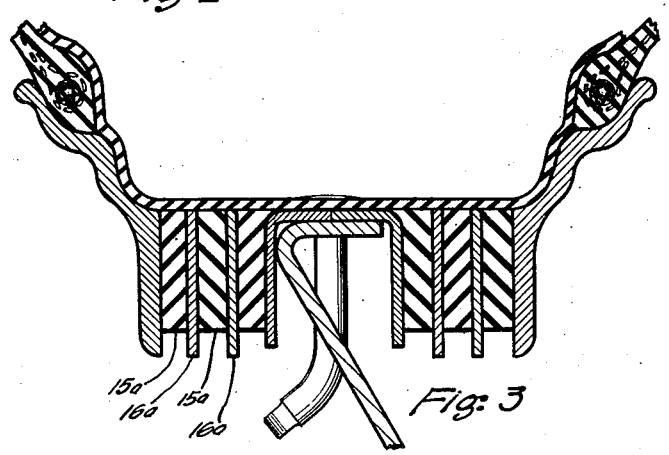
Fig. 3 is a fragmentary cross-section of a modification.

For greater over-all rim width with avoidance of radially inward bulging of the individual cushioning rings, a larger number of cushioning rings and interposed disc-like metal rings can be employed. The modification shown in Fig. 3, for example, has, on each side of the wheel body, three cushioning rings, 15ª, 15ª, and two of the disc-like metal rings, 16ª, 16ª. Also, in the construction shown in Fig. 3, a rim well extending almost throughout the width of the rim is provided for easy mounting and removal of the tire.

The assembly as described manifestly provides the advantages indicated in the above statement of objects.

I claim:

1. A pneumatic tire and wheel assembly comprising a wheel body, a pneumatic tire mounted thereon and a plurality of rings of resiliently deformable material interposed between the said wheel body and the said pneumatic tire and supporting their loads wholly by their inherent, simple, resistance to deformation, and a floating rigid ring embraced by the said rings.

2. A pneumatic tire and wheel assembly comprising a wheel body, a pneumatic tire mounted thereon and two sets of rings of resiliently deformable material interposed between said wheel body and said pneumatic tire, at opposite sides of the wheel body and supporting their loads wholly by their inherent, simple, resistance to deformation, and a floating rigid ring embraced by adjacent deformable rings of each set.

3. A rim for a pneumatic tire, said rim comprising a rigid middle rim member, a tire-engaging rigid member on each side of and spaced axially from the said rim member, and a set of rings of resiliently deformable material constituting the only support between the said rim member and each of the tire-engaging members and supporting their loads wholly by their inherent, simple, resistance to deformation, and a floating rigid ring embraced by rings of the deformable material.

4. A rim for a pneumatic tire, said rim comprising a rigid middle rim member, a tire-engaging rigid member on each side of and spaced axially from the said rim member, and connected to them only by adhesion, resiliently deformable material constituting the only support between the said rim member and each of the tire-engaging members and supporting its load wholly by its inherent, simple, resistance to deformation.

5. A pneumatic tire and wheel assembly comprising a wheel body, a pneumatic tire mounted thereon and a plurality of rings of resiliently deformable material interposed between the two and supporting their loads wholly by their inherent, simple, resistance to deformation, and a floating rigid ring embraced by the said rings, the said rings being connected to one another only by adhesion.

6. A pneumatic tire and wheel assembly comprising a wheel body, a pneumatic tire mounted thereon and two sets of rings of resiliently deformable material interposed between the wheel body and the pneumatic tire, at opposite sides of the wheel body and supporting their loads wholly by their inherent, simple, resistance to deformation, and a floating rigid ring embraced by adjacent deformable rings of each set, the said rings being connected to one another only by adhesion.

7. A rim for a pneumatic tire, said rim comprising a rigid middle rim member, a tire-engaging rigid member on each side of and spaced axially from the said rim member, and a set of rings of resiliently deformable material constituting the only support between the said rim member and each of the tire-engaging members and supporting the loads wholly by their inherent, simple, resistance to deformation, and a floating rigid ring embraced by rings of the deformable material, the said rings being connected to one another only by adhesion.

8. A pneumatic tire and wheel assembly comprising a tire casing and a wheel rim defining an air chamber, said rim comprising rings of material having substantially the resilient deformability of vulcanized soft rubber and each having in cross-section greater radial than axial dimension, and a floating rigid ring embraced by the said rings.

9. A pneumatic tire and wheel assembly comprising a tire casing and a wheel rim defining an air chamber, said rim comprising rings of material having substantially the resilient deformability of vulcanized soft rubber and each having in cross-section greater radial than axial dimension, and a floating rigid ring embraced by the said rings and being of greater radial dimension than they are.

10. A pneumatic tire and wheel assembly comprising a wheel body, a pneumatic tire mounted thereon and a plurality of rings of resiliently deformable material interposed between the two and supporting their loads wholly by their inherent, simple, resistance to deformation, and a floating rigid ring embraced by the said rings, said floating ring projecting radially inward beyond the inner peripheries of the deformable rings.

DAVID M. GOODRICH.